US006363608B1

(12) United States Patent
Koike et al.

(10) Patent No.: US 6,363,608 B1
(45) Date of Patent: Apr. 2, 2002

(54) METHOD OF MANUFACTURING PISTON

(75) Inventors: Toshikatsu Koike; Seiji Inoue, both of Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 09/058,769

(22) Filed: Apr. 10, 1998

(30) Foreign Application Priority Data

Apr. 10, 1997 (JP) ............................................ 9-108173

(51) Int. Cl.[7] ................................................ B23P 15/00
(52) U.S. Cl. ....................................... 29/888.04; 72/258
(58) Field of Search ........................ 29/888.04; 92/224; 72/258, 264, 268, 271, 362

(56) References Cited

U.S. PATENT DOCUMENTS

| | | | | |
|---|---|---|---|---|
| 1,835,863 A | * 12/1931 | Greve | 29/888.04 |
| 2,707,136 A | 4/1955 | Fahlman | |
| 3,009,237 A | * 11/1961 | Lehmeier | 29/888.04 |
| 3,070,414 A | * 12/1962 | Wilcoxon | 29/888.04 |
| 4,051,590 A | * 10/1977 | Halton et al. | 29/DIG. 31 |
| 4,434,014 A | 2/1984 | Smith | |
| 6,070,323 A | * 6/2000 | Koike et al. | 29/888.04 |

FOREIGN PATENT DOCUMENTS

| | | |
|---|---|---|
| CH | 449 719 | 1/1971 |
| DE | 3719121 A1 | 12/1988 |
| DE | 3822031 A1 | 1/1990 |
| EP | 0153 473 A2 | 12/1984 |
| FR | 1226350 | 7/1960 |
| JP | 63-126661 | 5/1988 |
| JP | 63-132743 | 6/1988 |
| JP | 1-180927 | 7/1989 |
| JP | 2-107749 | 8/1990 |
| JP | 2-233858 | 9/1990 |
| JP | 9-76042 | 3/1997 |

* cited by examiner

*Primary Examiner*—I Cuda Rosenbaum
(74) *Attorney, Agent, or Firm*—Ernest A. Beutler

(57) ABSTRACT

A composite piston and method for forming such a piston for a reciprocating machine such as an internal combustion engine. A blank is formed from a pair of dissimilar alloys, one of which has substantially greater properties such as strength or abrasion resistance. The blank is formed by a process whereby he two materials are initially bonded and extruded into a composite blank. The blank is forged into a piston in such a way that the two materials are bonded together in the forging process. The higher strength and/or abrasion resistance material forms at least a part of the outer surface of the piston in areas where the better properties are required. The other material backs up the higher strength or hardness material in necessary areas so as to provide an integral structure that has lightweight, low costs and nevertheless the desired properties.

32 Claims, 7 Drawing Sheets

METHOD OF MANUFACTURING PISTON

BACKGROUND OF THE INVENTION

This invention relates to a method of making a piston for a machine such as an internal combustion engine and more particularly to a method for manufacturing a composite blank and a method for forging a composite piston.

The piston in a reciprocating machine is obviously a very critical part of the mechanism. This is particularly true with internal combustion engines in as much as the piston is the part of the engine that receives the explosive force from the combustion and transmits it through the connecting rod to a crankshaft for providing an output force. The various parts of the piston have specific functions in order to achieve this result The head of the piston must be able to withstand the compressive force and temperature of combustion. Also the area adjacent the upper surface of the head forms a ring groove area where the piston rings are supported. These provide a sealing function with the cylinder bore so as to confine the combustion products.

The piston is also provided with pin bosses that receive the piston pin and which transmit the force from the piston to the connecting rod through the piston pin. Obviously, there are high forced transmissions in this area In addition, the piston as a skirt portion that rubs against the cylinder bore and which assists in maintaining the piston in an upright condition within the cylinder bore. In addition, the side thrusts on the piston are taken by the skirt and thus it is also subjected to forces and must have high abrasion resistance due to its rubbing action with the cylinder bore.

Thus, it should be apparent that the different parts of the piston have different functions that require optimally different materials. Of course, it is possible to form the entire piston from the same material but this can give rise to high costs and also high weights. It is important to reduce the weight of the piston so as to reduce the inertial loading on the engine and provide high power outputs and high engine crankshafts speeds. Also, the lighter the weight the lighter the balancing masses in the engine can be in order to reduce vibrations.

Some of these functions can be achieved by changing the dimensions of the piston either alone or in combustion with changing the materials. For example, the sealing function can be improved if the piston ring area is made greater and a greater number or greater size of piston rings is employed. However, this causes emission problems in that the area around the piston rings may retain combustion products and can cause some emission concerns.

Thus, there has been proposed the formation of pistons with different materials, each serving its intended purpose for the particular part of the piston in which it is positioned. However, this is quite a difficulty in adhering or connecting these different materials to each other to provide a unitary structure. Some more methods of connections can be employ brazing or welding. However, when applied with these additional heats in order to connect the materials together, then deterioration in the properties of the associated and affected materials can result thus defeating the main purpose of the composite construction.

It has also been proposed to improve the strength of the piston in certain areas by casting in inserts in the areas where stresses is highest. For example, it has been proposed to cast in inserts in the area of the piston pin bosses so as to increase their strength without adding significantly to the overall weight of the piston. However, this also has some of the same problems aforenoted in connection with using dissimilar materials. Furthermore, the casting process becomes somewhat complicated and thus this method does not totally solve the problem.

Forging is another technique by which composite materials may be used. Some methods have been proposed, but they have not been totally successful in achieving the desired bonding strength. Therefore there has been proposed a method and construction that employs a combination of powdered metal technology and forging bonding that can produce excellent results. This is disclosed in the co-pending application of certain of the inventors hereof entitled "Piston For Internal Combustion Engine And Process Of Making Same", Ser. No. 08/859536, Filed May 20, 1997 and assigned to the assignee hereof.

The materials utilized also are important not only to achieve the desired properties, but also the proper bond. Basically, pistons for engines are generally formed from aluminum or aluminum alloy materials. The aluminum has the advantage of light weight and relatively high strength. However, the use of alloy materials has been resorted to so as to improve certain characteristics.

For example, silicon (Si) in alloyed with the aluminum to increase abrasion resistance and resistance to hardening under temperature. Copper (Cu) and Magnesium (Mg) have also been employed for increasing strength. At times, however, these alloying elements can present some problems in that their inclusion in a casting process can cause a difference in particle sizes which can offset some of the benefits of the alloying.

There has also been proposed, a method of forming a piston material by a form of sintering process that permits the forging of a piston to obtain the desired characteristics. Such an arrangement is disclosed in the co-pending application entitled "Piston For Internal Combustion Engine And Material Therefore", Ser. No. 09/022647, filed, Feb. 12, 1998, and also assigned to the assignee hereof.

In accordance with the features hereof these materials are combined with lower costs materials to form a composite piston that will provide the performance desired along with lightweight and lower costs.

It is, therefore, a principal object to this invention to provide a method of forming an improved piston construction for an internal combustion engine.

It is a further object to this invention to provide an improved method by which a lightweight, high strength and high abrasion resistant, composite piston for a reciprocating machine may be formed.

It is a further object to this invention to provide an improved method for making a low cost piston having the desired material requirements in the various areas of the piston.

It is a further object to this invention to provide an improved method for manufacturing a composite piston of the aforenoted type.

In accordance with the methods described in the aforenoted co-pending applications, a composite blank from which the piston will be forged is manufactured. The blank consists of a pair of cylindrical blank components that are placed together in a forging die and from which the finished composite piston is forged. It is important m connection with the forging process to ensure a good bond between the two dissimilar metal.

In accordance with a further feature of this invention, it is an object to provide a blank from which a piston can be forged from dissimilar materials wherein an initial bonding between the materials is created when the blank is formed and before it is forged into the piston shape.

SUMMARY OF THE INVENTION

This invention is adapted to be embodied in a method for forming a blank form dissimilar materials from which a piston may be forged. A first material is extruded under pressure into a generally cylindrical object in a chamber wherein a powder of the other material is contained. The powder and the formed cylindrical object are passed through an extrusion die under sufficient pressure so as to solidify the powder and establish a bond between the outer surface of the first material and the surrounding other material.

DETAILED DESCRIPTION OF THE PREFERRED EMBODIMENTS OF THE INVENTION

Figure 1:
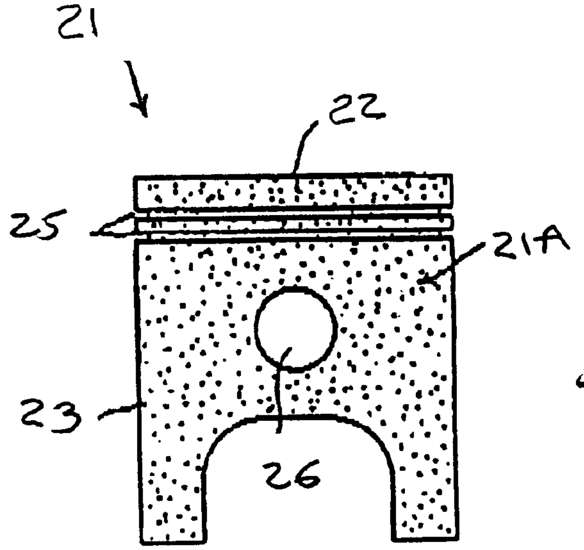
FIG. 1 is a side elevational view of a composite piston constructed in accordance with a first embodiment of the invention.
Figure 2:
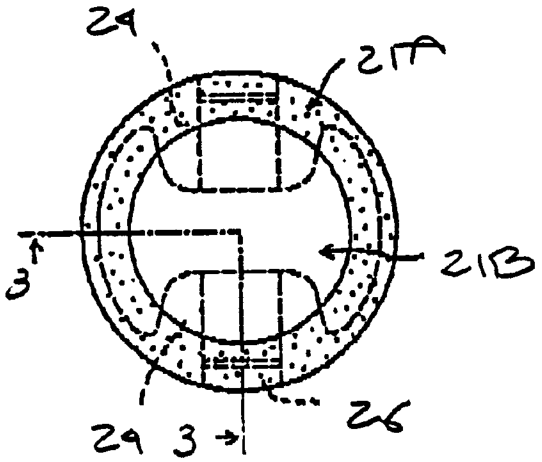
FIG. 2 is a top plan view of the piston of this embodiment.
Figure 3:
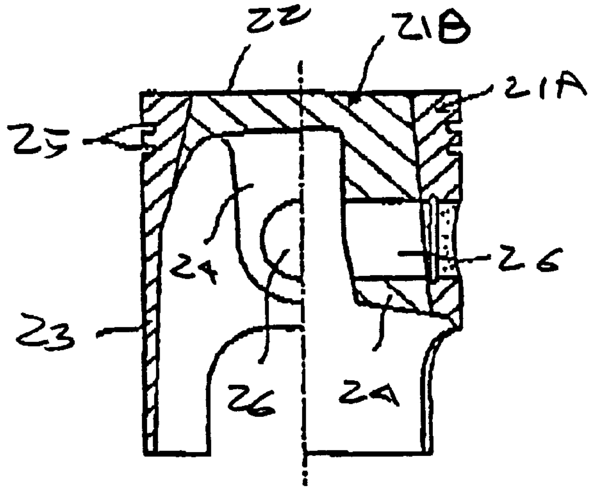
FIG. 3 is a cross sectional view taken along the line 3—3 of FIG. 2.

Referring now to the drawings and initially primarily to FIGS. 1–3, a piston 21 constructed in accordance with the invention is illustrated. The piston 21 has a configuration that in external appearance is similar to most conventional pistons. This includes a head portion 22 from which a skirt portion 23 depends. The interior of the piston 21 in the area of the piston skirt 23 is formed with larger thickness material portions that form piston pin bosses 24.

The area above the piston pin bosses 24 forms a head portion in which piston ring grooves 25 are received. A piston pin 26 is received in bored openings in the piston pin bosses 24 to provide the connection to the associated connecting rod which is not shown.

In accordance with the invention, the body of the piston pin 21 is formed from two materials comprised of a first material indicated at 21A which is of a higher strength and higher abrasion resistance and which is alloyed in a manner to be described and which is formed also in a manner to be described.

Because of the alloying of the material 21A, it has a higher cost and higher weight than the remaining base piston material, indicated at 21B. The base piston material 21B may be formed from a known lightweight and low cost material in a manner which will also be described. In fact, lower cost materials may be employed than with conventional pistons because the material 21A takes the higher loading, in a manner which will be described.

The piston 21 is forged from a blank, which will be described later by reference to FIGS. 8–13, by a forging process. However, preparatory to this forging process, the materials from which the portions 21*a* and 21*b* are formed will be described. Referring first to the material 21*a*, as has been noted, this may be a lower strength, lighter weight, lower cost material than the material used for the portion 21*a*. An example of a material that may be utilized for this purpose is an aluminum alloy conventionally used for casting as a melt production-type (continuous casting material) such as an aluminum alloy of a melt production-type containing aluminum (Al) as a base material. This may be alloyed with the following materials in the noted amounts:

10–22% by weight of silicon (Si)

1% by weight or less of iron (Fe)

0.5–5% by weight of copper (Cu)

0.5–2% by weight of magnesium (Mg)

1% by weight or less of manganese (Mn)

1% by weight or less of nickel (Ni)

1% by weight or less of chromium (Cr).

One specific example of such a material is an aluminum alloy of the melt production-type has the following constituents and amounts:

19% by weight of silicon (Si)

0.2% by weight of iron (Fe)

4% by weight of copper (Cu)

1% by weight of magnesium (Mg)

0.1% by weight of manganese (Mn)

0.1% by weight of nickel (Ni)

0.1% by weight of chromium (Cr).

Figure 4:
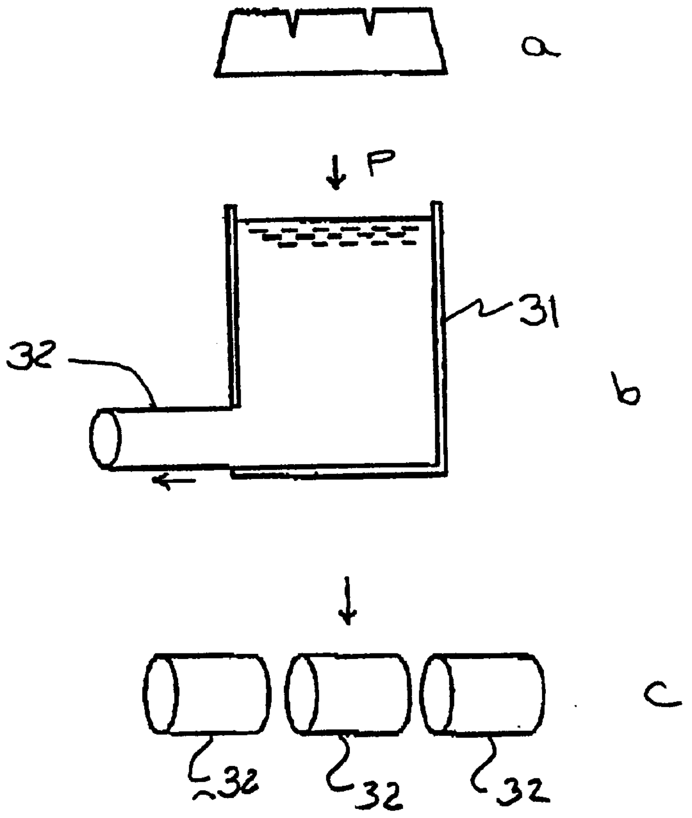
FIG. 4 is a three-part view, in partial perspective format, showing how the blanks for the lower strength material are formed.

The way in which this material is formed into the necessary blanks in order to form the blank from which the piston is forged will be described by reference to FIG. 4. In this figure, there is illustrated at the view "a" an ingot formed from the material, preferably as set forth in the preceding paragraph. This material is then placed into an extrusion apparatus (view "b"), indicated generally by the reference numeral 31 where it is melted and then pressurized as indicated by the arrow P so as to extrude a cylindrical or other configuration blank, indicated at 32. This blank 32 is then cut into segments of the appropriate line as shown in view "c" with each segment being indicated by the reference numeral 32.

Figure 5:
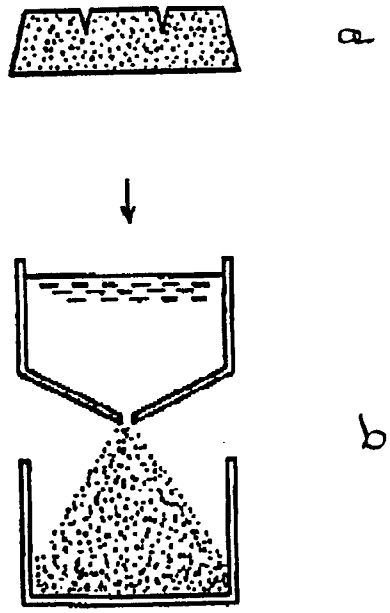
FIG. 5 is a two part view showing the steps by which the powder from which the higher strength material is formed.

Referring now to the material from which the piston portion 21 is formed, as has been noted, this is a higher strength, higher abrasion resistant and hence heavier and more expensive material. The material by which the piston portion 21A is formed is made as set forth in the aforenoted co-pending application, Ser. No. 09/022647. However, that method will be described again in detail here by reference to FIG. 5.

First, a powered metal is formed having the desired chemical constituents and alloying to be employed in the finished surface portion of the piston. This is done by first forming an ingot, as seen in view "a" from which the powered metal is to be formed which will be compressed then into a sintered state to form the blank from which the piston portion is forged.

The ingot is formed from an alloy of aluminum and certain alloying materials which are added to improve strength, abrasion resistance and resistance to deterioration under heat. Basically, this ingot is formed from an aluminum alloy that consists of aluminum (Al) as a base material and certain alloying materials such as silicon (Si), iron (Fe), and other materials as will be noted. As will become apparent as this description proceeds, the ingot is subsequently converted into a metal powder state that is subsequently heated and extruded to form blanks from which the piston portion 21A is forged.

Certain of these alloying materials may not be included directly in the ingot but may be formed as separate powders which are then mixed with the ingot powder during the extrusion and heating step that forms the formed metal blanks for forging. As will be described below, silicon carbide (SiC) is one of such materials that may be separately mixed with the powder formed from the ingot.

EXAMPLE 1

A first example of the material from which the ingot may be formed includes as alloying materials to the base aluminum (Al) the following alloying elements:

| | | |
|---|---|---|
| silicon (Si) | 10–22% | by weight |
| iron (Fe) | 1–10% | by weight |
| copper (Cu) | 0.5–5% | by weight |
| magnesium (Mg) | 0.5–5% | by weight |
| manganese (Mn) | 1% or less | by weight |
| nickel (Ni) | 1% or less | by weight |
| chromium (Cr) | 1% or less | by weight |
| zirconium (Zr) | 2% or less | by weight |
| molybdenum (Mo) | 1% or less | by weight |

The silicon alloying material improves abrasion resistance and resistance to cracking or breaking and is in the form of hard primary crystals or eutectic crystals in the metal texture. Iron is added to obtain high strength at temperatures of 200° C. or more and by disbursing and strengthening the metal texture. Copper and magnesium are added to improve the strength at temperatures less than 200° C. It has been found that amounts greater than outside the ranges specified may fail to obtain the desired abrasion resistance and strength at the varying temperatures.

EXAMPLE 2

A specific example of alloying material that falls within the range of Example 1 and which is preferred is as follows:

| | | |
|---|---|---|
| silicon (Si) | 17% | |
| iron (Fe) | 5% | by weight |
| copper (Cu) | 1% | by weight |
| magnesium (Mg) | 5% | by weight |
| manganese (Mn) | 0.01% | by weight |
| nickel (Ni) | 0.01% | by weight |
| chromium (Cr) | 0.01% | by weight |
| zirconium (Zr) | 1% | by weight |
| molybdenum (Mo) | 0.01% | by weight |

EXAMPLE 3

Another range of embodiment of alloy that can be employed in connection with the invention employs Silicon carbide (SiC) as an alloying material and has the following alloying elements:

| | | |
|---|---|---|
| silicon (Si) | 10–22% | by weight |
| iron (Fe) | 1–10% | by weight |
| copper (Cu) | 0.5–5% | by weight |
| magnesium (Mg) | 0.5–5% | by weight |
| manganese (Mn) | 1% or less | by weight |
| nickel (Ni) | 1% or less | by weight |
| chromium (Cr) | 1% or less | by weight |
| zirconium (Zr) | 2% or less | by weight |
| molybdenum (Mo) | 1% or less | by weight |
| silicon carbide (SiC) | 1–10% | by weight |

EXAMPLE 4

A specific preferred embodiment employing silicon carbide as an alloying agent falling within the range of Example 3 includes the following components:

| | | |
|---|---|---|
| silicon (Si) | 17% | by weight |
| iron (Fe) | 5% | by weight |
| copper (Cu) | 1% | by weight |
| magnesium (Mg) | 0.5% | by weight |
| manganese (Mn) | 0.01% | by weight |
| nickel (Ni) | 0.01% | by weight |
| chromium (Cr) | 0.01% | by weight |
| zirconium (Zr) | 1% | by weight |
| molybdenum (Mo) | 0.01% | by weight |
| silicon carbide (SiC) | 5% | by weight |

In addition to silicon carbide, other materials such as aluminum oxide ($Al_2O_3$) or aluminum nitride (AlN) may be substituted to improve abrasion resistance in the amounts specified in Examples 3 and 4, i.e. 1–10% or specifically 5%.

It has been found that the crystalline size of certain of the alloying materials is important in obtaining the desired abrasion resistance, resistance to cracking and high fatigue strength. For example, the initial crystalline silicon particle diameter should be not greater than 10 $\mu$m. Also, the average particle diameter of the iron should be not greater than 10 $\mu$m. Where as has been previously noted, these alloying materials may be either incorporated in the ingot from which the powder is formed or may be formed from separate particles that are molded into the pellet through mixing with the particles formed from the primary aluminum alloy. Either method can be employed so long as the resulting crystalline particle size is within the range set forth.

In the examples given as Example 3 and Example 4 it is particularly advantageous to add the silicon carbide (SiC) as a separate powder mixed with the powder from the ingot before solidifying. If this is done the particle size of the silicon carbide (SiC) powder before mixing should preferably be 5 $\mu$m.

The particles are formed by melting the ingot from the alloy and the base materials at a temperature of 700° C. or more. This molten material is then sprayed like a fog and rapidly cooled to solidify at a cooling rate of at least 100° C. per second thereby obtaining a rapidly solidified powder metal of the aluminum alloy as seen in view “b” of FIG. 5. It has been found that good results can be obtained when the specific particle size of the wear-resistant material such as the silicon carbide has a diameter of 5 $\mu$m. As has been noted, this is particularly useful when the particles are formed separately and combined in the next step which will be described.

Figure 6:
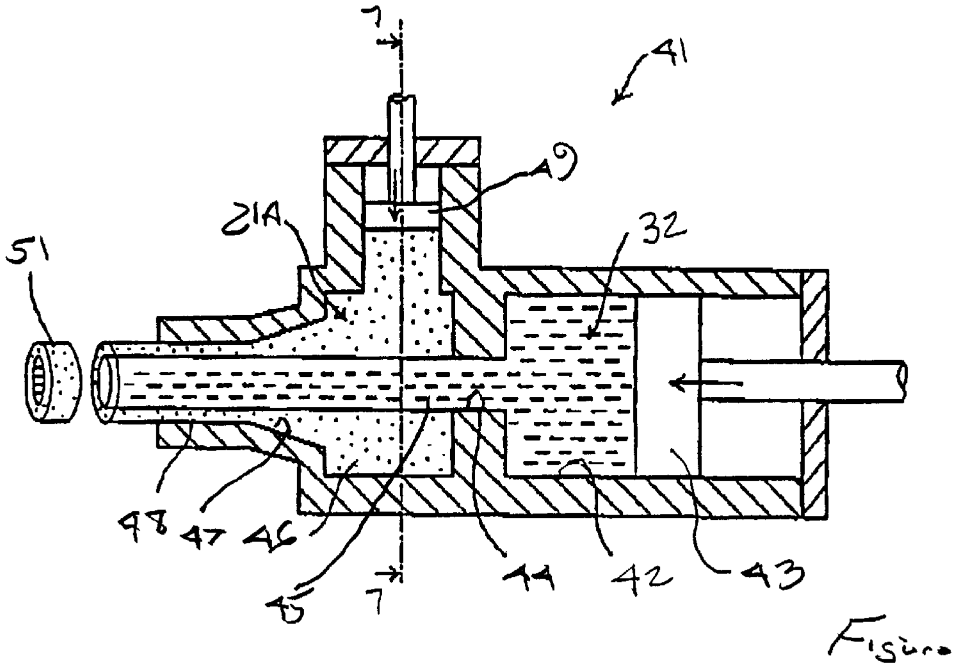
FIG. 6 is a partial perspective cross-sectional view showing the apparatus for practicing the invention and is taken generally along the line 6—6 of FIG. 7.
Figure 7:
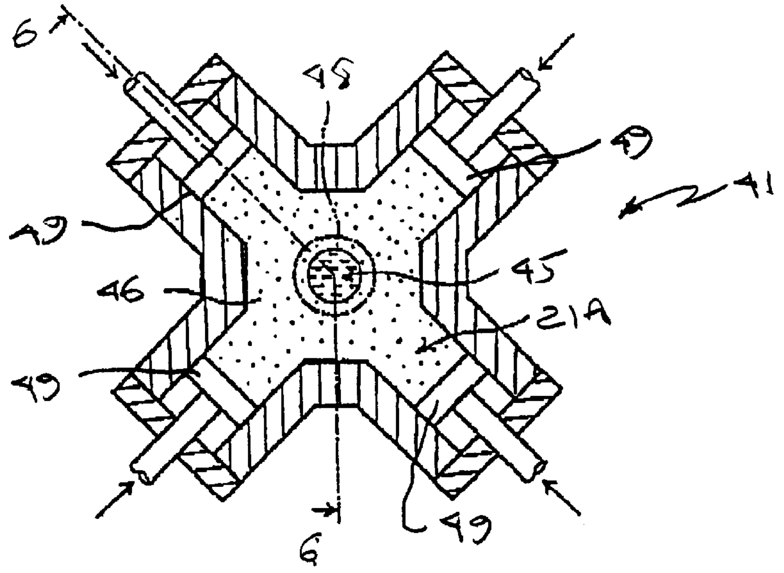
FIG. 7 is a cross-sectional view taken along the line 7—7 of FIG. 6.

Having thus formed the materials from which the piston 21 is to be formed, they are then placed in an extruding apparatus, shown in FIGS. 6 and 7 and indicated generally by the reference numeral 41. The apparatus 41 includes a first cylindrical chamber 42 wherein the solid blank 32 of the material for the blank portion 21B is positioned. This is heated to a temperature in the range of 400° C. to 500° C. A piston 43 acts to extrude this material through a restricted extruding opening 44. Thus, there will be a solid core 45 formed around which the piston material 21A is extruded.

Thus, the core 45 that is formed is extruded into a chamber 46. This chamber 76 has a tapering portion 47 that leads to an extruding portion 48.

Four side pistons 49 compresses the metal particles of the material 21A along with other alloying materials not previously added in the chamber 46 and extrude them through the opening 48 so that a composite blank 51 is formed. This blank 51 will thus not only facilitate the extrusion, but also will permit some initial bonding of the material.

Figure 8:
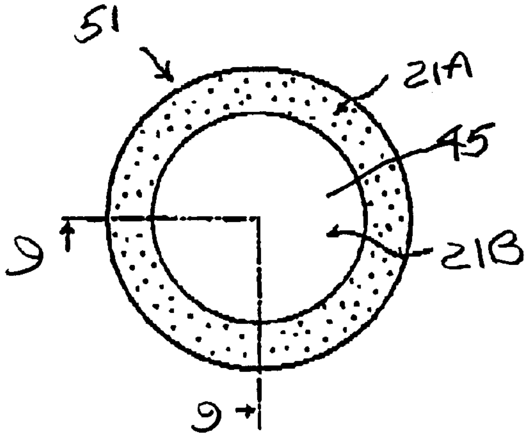
FIG. 8 is a cross-sectional view taken through one of the blanks formed by the apparatus shown in FIGS. 6 and 7 and made in accordance with an embodiment of the invention.
Figure 9:
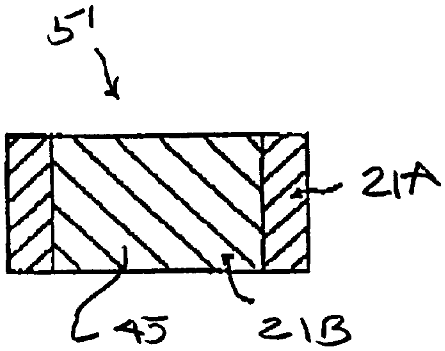
FIG. 9 is a cross-sectional view taken along the line 9—9 of FIG. 8.

One form in which the blank 51 may take is shown in FIGS. 8 and 9. In this form, the blank comprised of the materials 21A and 21B have uniform diameter and thickness, in the case of the material 21A. This assumes that the blank 45 is formed in a cylindrical configuration having the shape of a right circular cylinder and the material 21A is also formed in a cylindrical configuration. It should be noted that the extruding process also acts to ensure good bond between the two materials 21A and 21B even before the forging operation has begun. That is, surface oxide coatings will be removed during the extrusion process.

Figure 10:
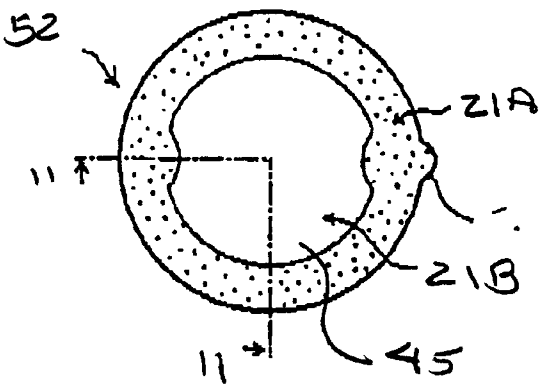
FIG. 10 is an end elevational view of another blank that may be formed in accordance with another embodiment of the invention.
Figure 11:
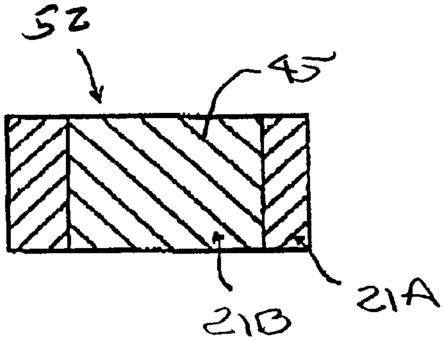
FIG. 11 is a cross-sectional view taken along the line 11—11 of FIG. 10.

Alternatively, the wall thickness of the blank 45 and the surrounding portion 21A may be non-uniform as shown in FIGS. 10 and 11 wherein the blank is indicated by the reference numeral 52. The thickened areas for one or the other material can be utilized so as to provide greater strength, if the material 21A is thickened or less weight if the material 21B is thickened. The area of thickening can be varied depending upon the specific application. For example, this can be done in the area where the piston and bosses 24 are formed, although the invention is not so limited.

The piston is then forged from this blank 51 or 52. After the blank 51 or 52 is formed, it is then placed in the forging apparatus shown in FIGS. 12 and 13 and which forging apparatus is indicated generally by the reference numeral 61. This forging apparatus 61 includes a female die 62 having a cylindrical opening 63 closed by an end wall 64 having a central projection 65 that will form the interior configuration of the piston 21.

Figure 12:
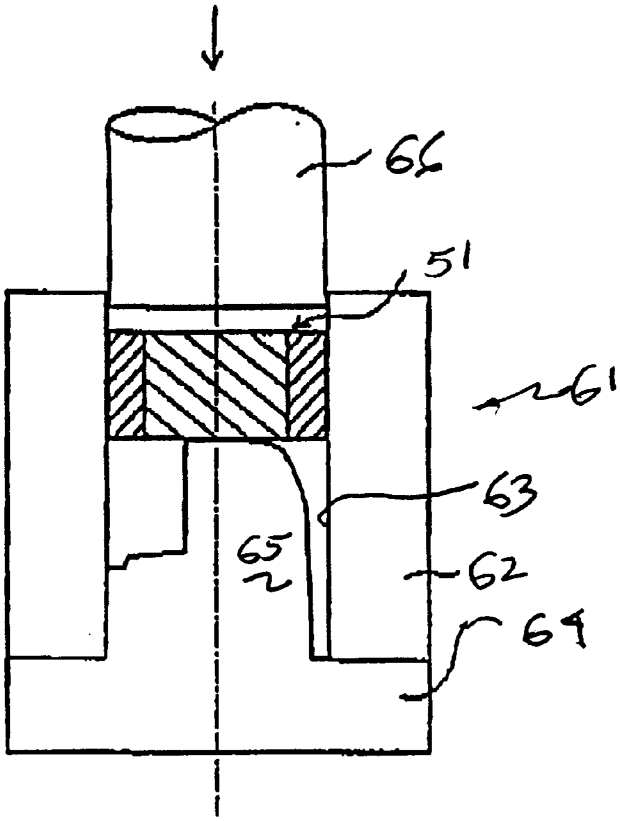
FIG. 12 is a cross sectional view showing a blank in the forging apparatus before the forging has commenced.
Figure 13:
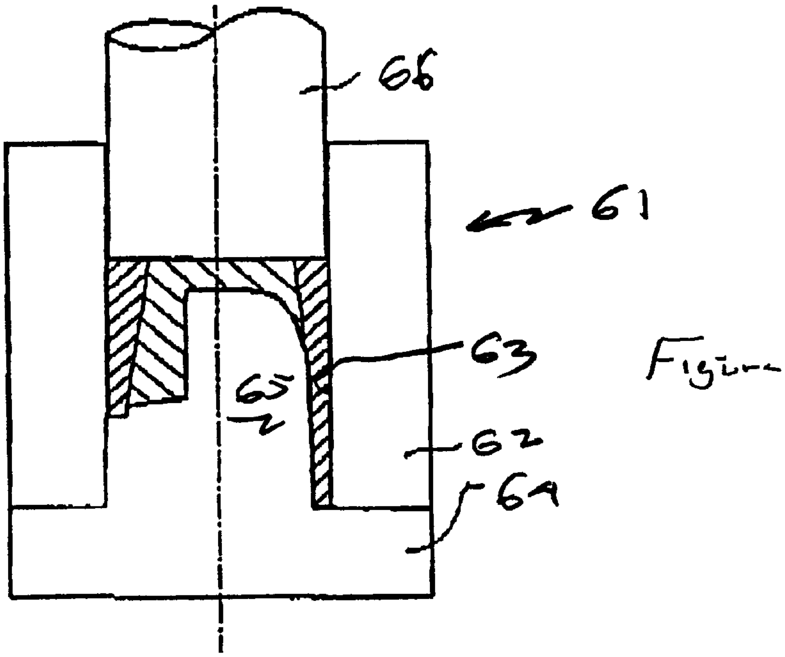
FIG. 13 is a cross sectional view, in part similar to FIG. 12, and shows the completion of the forging operation.

It should be noted that the sections of FIGS. 12 and 13 are taken along the same plane as FIG. 3 so that the piston shape can be compared although the sides are reversed in this figure.

The blank 51 may be coated with a release material and also may be heated to bring it up to a temperature less than 700° C. and preferably in the range of 400 to 500° C. A ram 66 is then pressed into the forging die 62 to the position shown in FIG. 13 wherein the final shape of the piston 21 is formed.

Preferably, the die 62 and forging press 66 are also brought up to a temperature less than 700° C. and then in the range of 400 to 500° C. If this is done, the blank 51 need not be heated but can be left in the dies for a time period until it reaches this temperature.

After the forging has been completed, then finished machining, heat treating and other machining steps can be formed. This can include the cutting of the ring grooves, final honing of the piston pin holes and any other finish machining and surface treatment as may be desired.

During the forging process, any remaining surface oxides of the material of either of the blank materials 21A or 21B will be destroyed by the friction of the forging process. This improves the bond between the materials and increases the strength of the resulting piston.

The surface properties of the resulting piston and particularly the specific areas of the piston comprised of the materials 21A and 21B will now be described by references to FIGS. 14 and 15. In these figures, the characteristics of Examples 2 and 4 above are compared as materials A2 and A4 with an example of a conventional piston material identified at B. Basically, the difference between Materials A2 and A4 is that Material A2 has no silicone carbide while Material A4 is alloyed with silicone carbide. Except for this difference, the constituents of the two alloys are the same.

Figure 14:
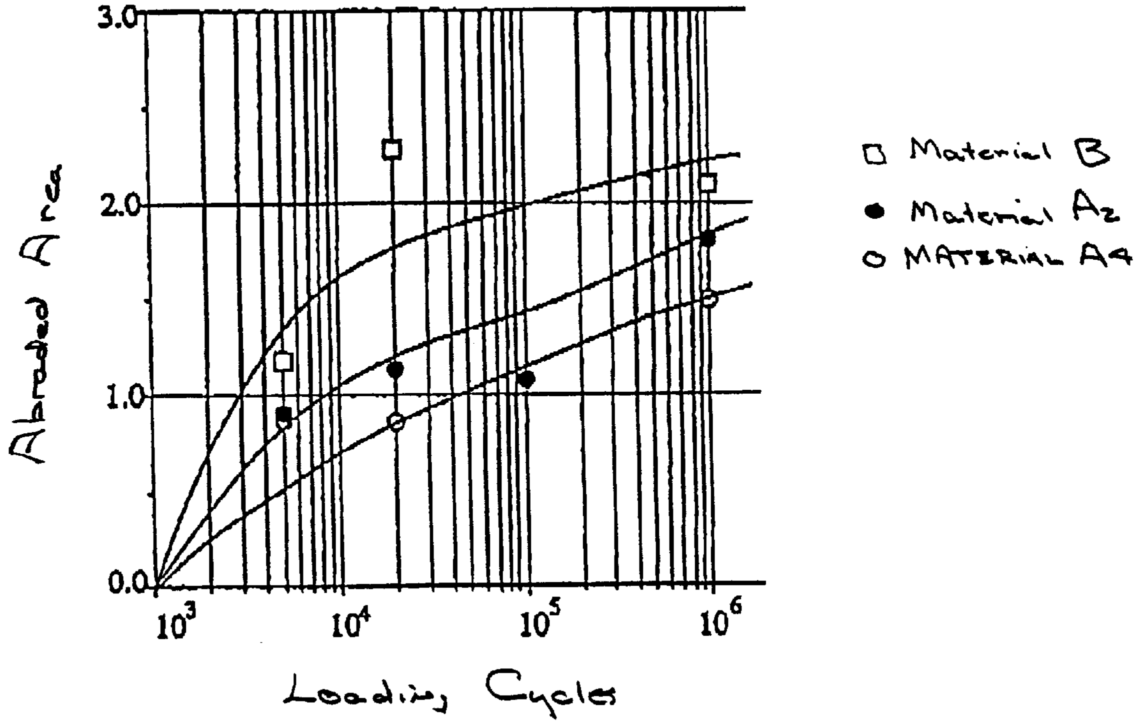
FIG. 14 is a graphical view showing the abrasion resistance for different materials.

FIG. 14 shows the results of a conventional fretting type abrasion test. This is done by repeatedly scuffing the material. This is done at a temperature of 250° C. The greater the area of abrasion marks, the less the abrasion resistance. It will be seen that the two alloy materials in accordance with the invention, i.e. Materials A2 and A4, have much greater abrasion resistance then the conventional piston material B. As a result, the areas that are subject to abrasion are formed with this surface and the remaining area of the piston can be made from the lighter weight, less expensive material.

Figure 15:
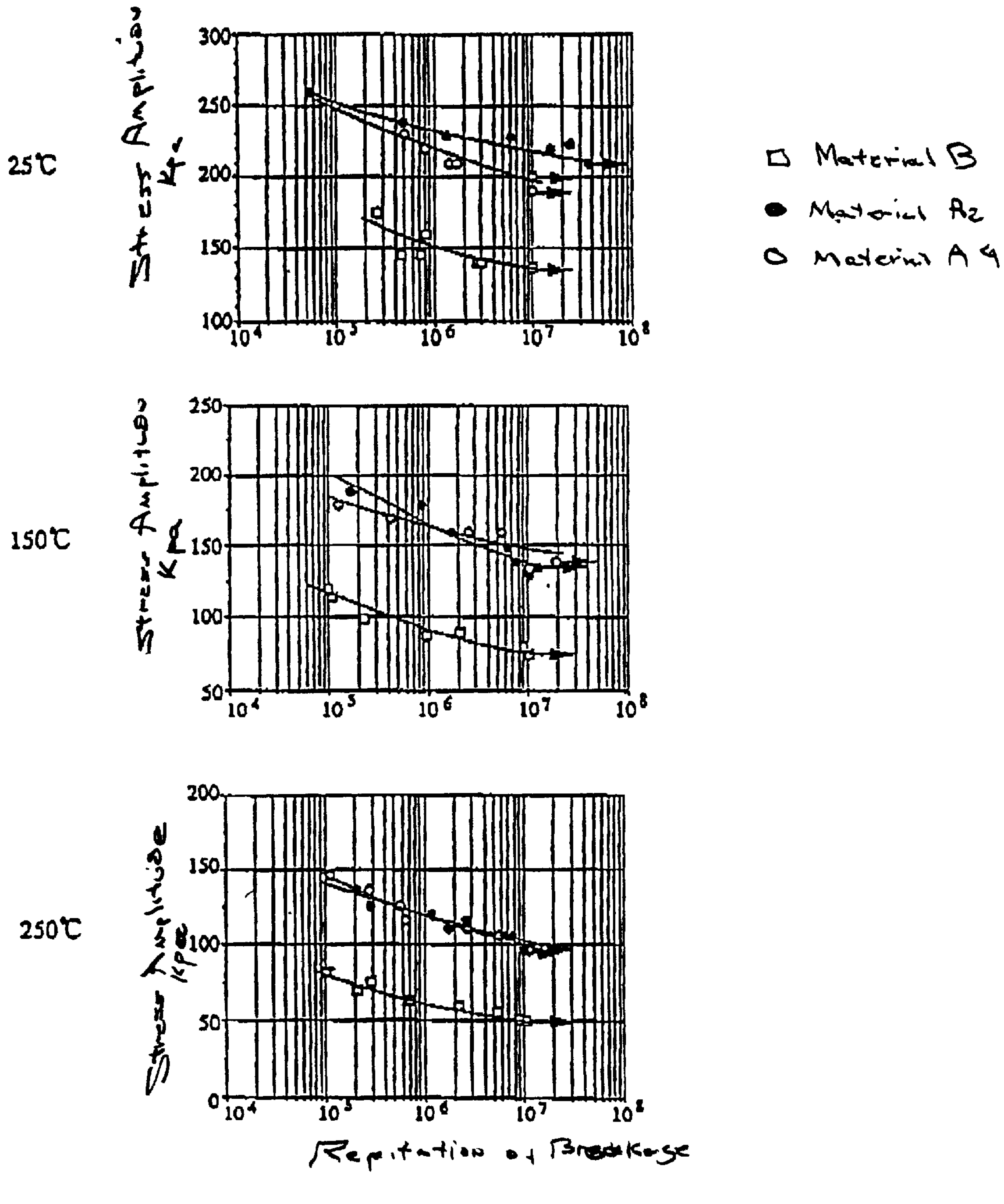
FIG. 15 is a graphical view showing the fatigue strength of certain materials at varying operating temperatures.
Figure 1:
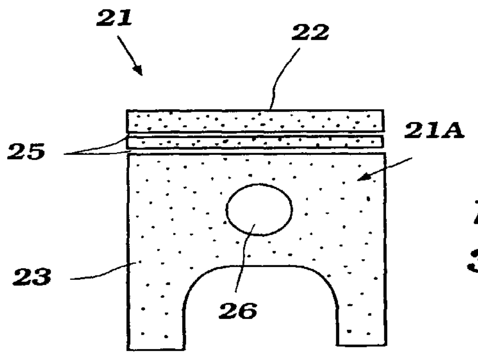
Figure 2:
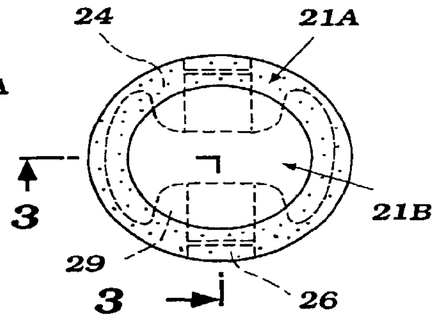
Figure 3:
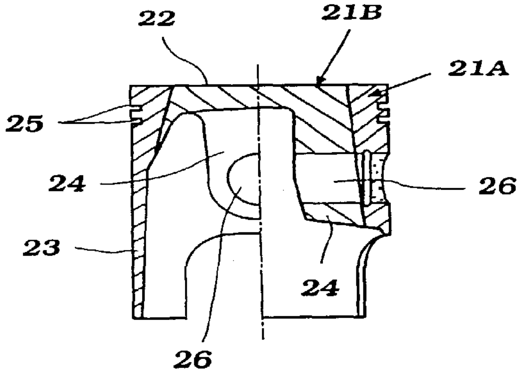
Figure 4:
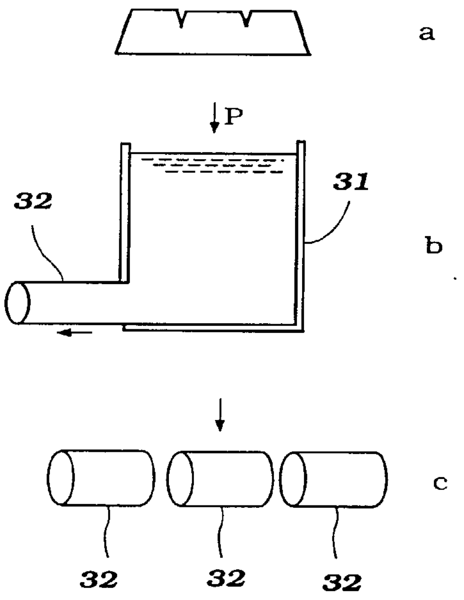
Figure 5:
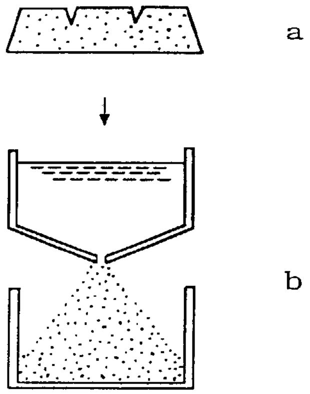
Figure 6:
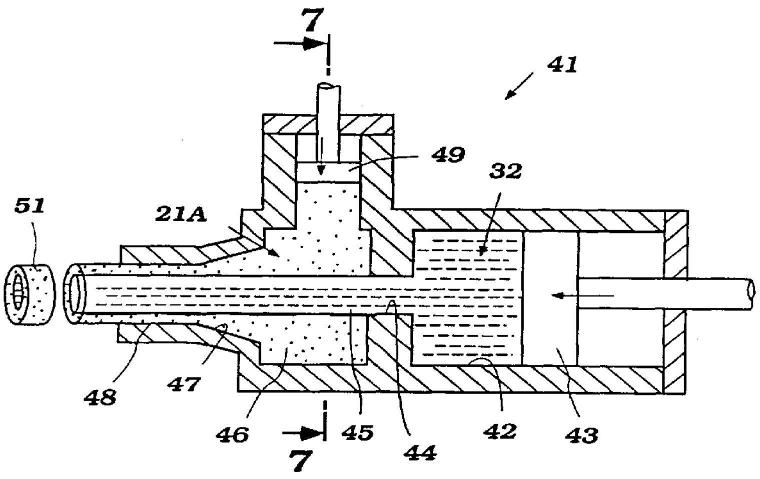
Figure 7:
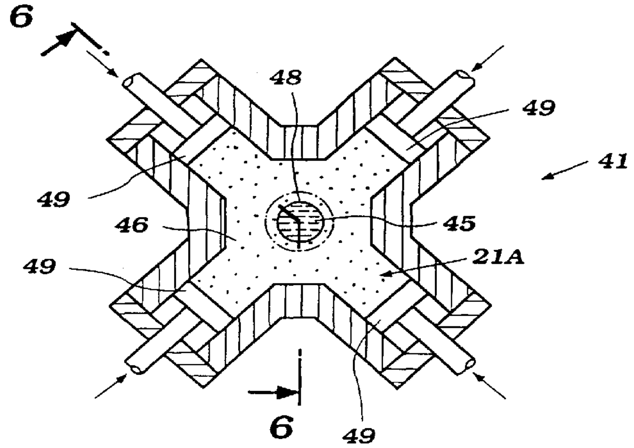
Figure 8:
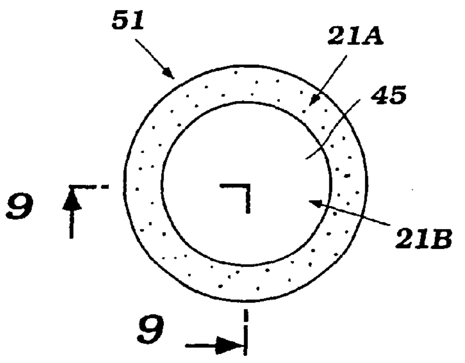
Figure 9:
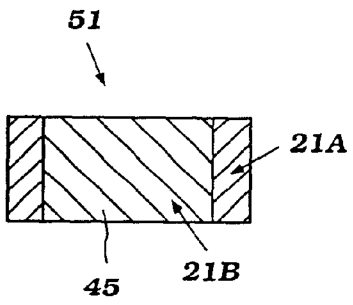
Figure 10:
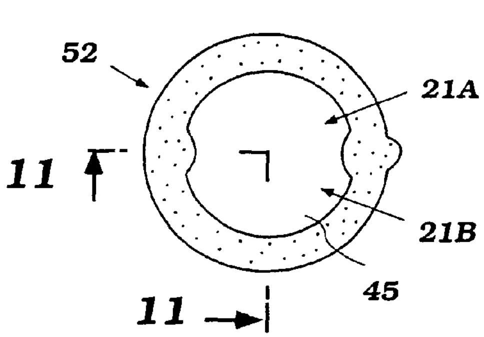
Figure 11:
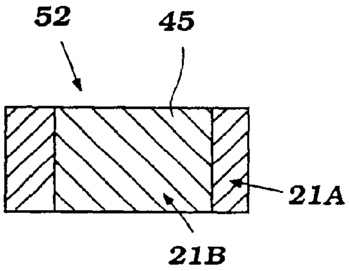
Figure 12:
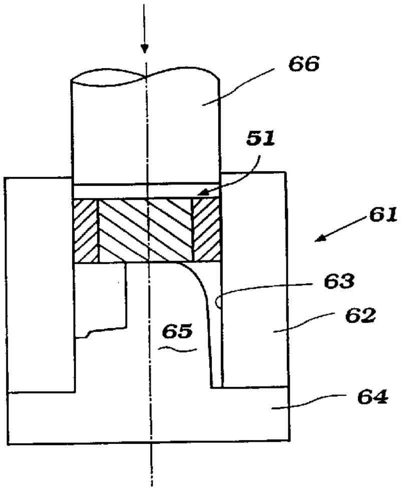
Figure 13:
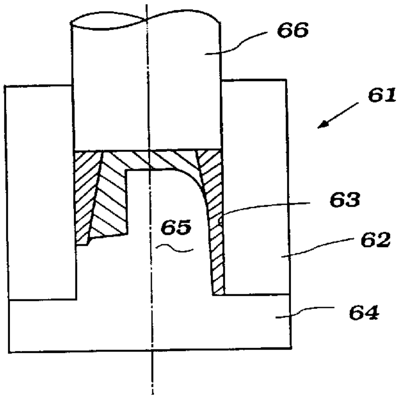
Figure 14:
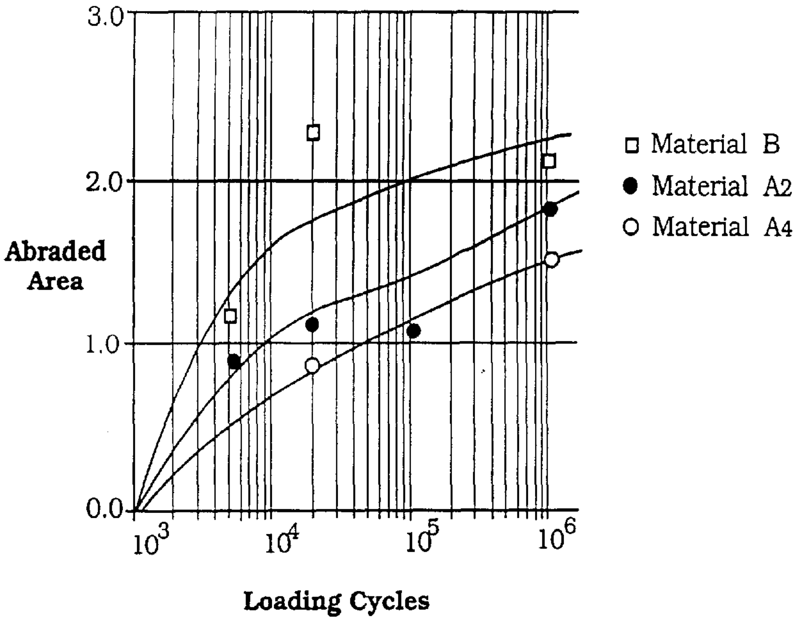
Figure 15:
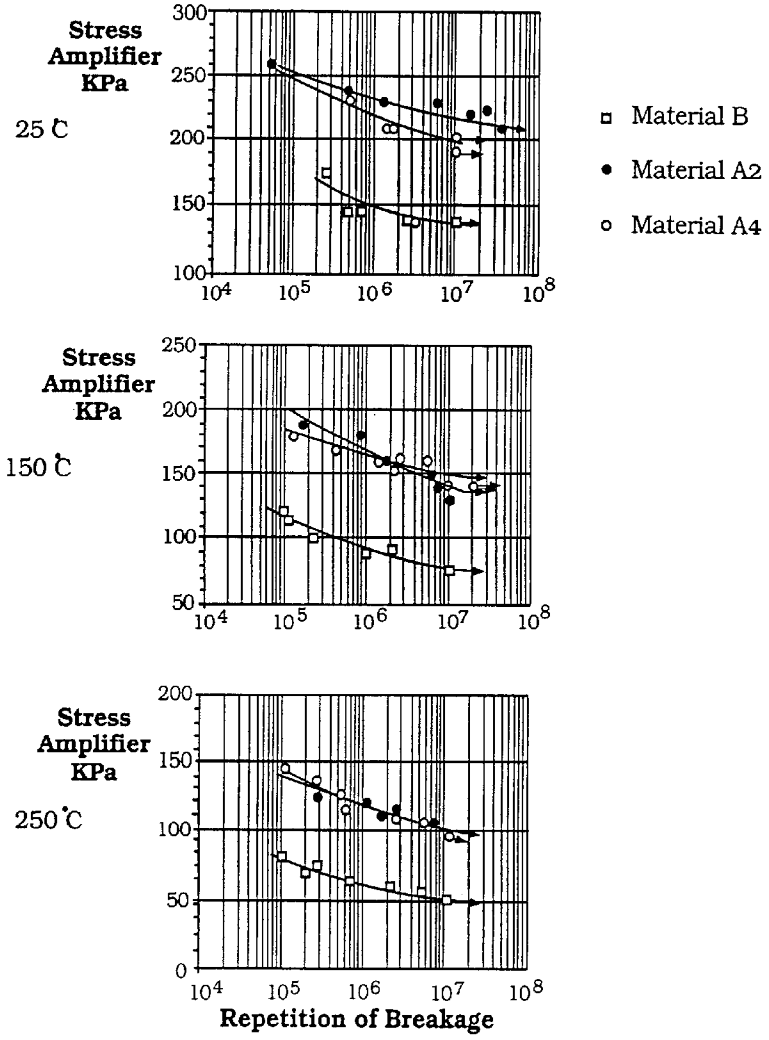

FIG. 15 shows the fatigues strengths of the same respective materials at various temperatures. It will be seen that the fatigue strength at various temperatures is much greater for the materials in accordance with the invention then the conventional material that is used for the base of the piston. Hence, by utilizing this method it is possible to improve the piston performance while not increasing significantly its weight or cost.

What is claimed is:

1. A method of forming a blank from a Sintered, powdered material through an extrusion process comprising the steps of forming the powdered material, placing the powdered material in an extruding die having a cavity terminating in a restricted discharge passage, passing a core having an external surface smaller than said discharge passage through said cavity and into said discharge passage, applying heat and pressure to the powdered material to compress and extrude the powdered material through the restricted opening of the die and compact it into a solid object surrounding and bonded to said core.

2. The method of forming a blank as set forth in claim 1, wherein the core and the powdered material are different.

3. The method of forming a blank as set forth in claim 2, wherein one of the materials has a property having characteristics selected from the group of strength and abrasion resistance that is substantially greater than the other.

4. The method of forming a blank as set forth in claim 3, wherein the one material comprises the powdered material.

5. The method of forming a blank as set forth in claim 1, wherein both of the materials are aluminum alloys.

6. The method of forming a blank as set forth in claim 5, wherein the alloys of the core and the powdered material are different.

7. The method of forming a blank as set forth in claim 6, wherein one of the materials has a property having characteristics selected from the group of strength and abrasion resistance that is substantially greater than the other.

8. The method of forming a blank as set forth in claim 7, wherein the one material comprises the powdered material.

9. The method of forming a blank as set forth in claim 2, wherein the core is formed by extruding its material through the cavity containing the powdered material by extruding it through a second die having a restricted cylindrical discharge passage for forming the core from the second material so that the powdered first material encircles the core prior to and during its extrusion.

10. The method of forming a blank as set forth in claim 9, wherein both of the materials are aluminum alloys.

11. The method of forming a blank as set forth in claim 10, wherein the alloys of the core and the powdered material are different.

12. The method of forming a blank as set forth in claim 11, wherein one of the materials has a property having characteristics selected from the group of strength and abrasion resistance that is substantially greater than the other.

13. The method of forming a blank as set forth in claim 12, wherein the one material comprises the powdered material.

14. The method of forming a blank as set forth in claim 1, wherein the powdered material is formed by forming an ingot from the alloy of aluminum and an alloying material, melting the ingot, dispersing the resulting liquid as a spray in a chilling stream to form powdered metal particles.

15. The method of forming a blank as set forth in claim 14, wherein the compression and extrusion of the powdered material is done at a material temperature less than 700° C.

16. The method of forming a blank as set forth in claim 15, wherein the compression and extrusion is done at a material temperature in the range of 400–500° C.

17. A method of forming a piston from a blank formed as set forth in claim 1, further including the steps of placing the blank in a forging die and forging a composite piston comprised of a head portion having an upper surface adapted to experience pressure and a peripheral ring groove portion for receiving at least one sealing ring below said upper surface, a skirt portion comprised of at least a pair of surfaces for sliding engagement with a cylinder bore formed below said head portion, and a pair of piston pin bosses having piston pin receiving openings for connection to a connecting rod small end by a piston pin, said piston pin bosses being formed between circumferentially spaced portions of said skirt portion surfaces.

18. The method of forming a piston as set forth in claim 16, wherein the core and the powdered material are different.

19. The method of forming a piston as set forth in claim 18, wherein one of the materials has a property having characteristics selected from the group of strength and abrasion resistance that is substantially greater than the other.

20. The method of forming a piston as set forth in claim 19, wherein the one material comprises the powdered material.

21. The method of forming a piston as set forth in claim 17, wherein both of the materials are aluminum alloys.

22. The method of forming a piston as set forth in claim 21, wherein the alloys of the core and the powdered material are different.

23. The method of forming a piston as set forth in claim 22, wherein one of the materials has a property having characteristics selected from the group of strength and abrasion resistance that is substantially greater than the other.

24. The method of forming a piston as set forth in claim 23, wherein the one material comprises the powdered material.

25. The method of forming a piston as set forth in claim 18, wherein the core is formed by extruding its material through the cavity containing the powdered material by extruding it through a second die having a restricted cylindrical discharge passage for forming the core from the second material so that the powdered first material encircles the core prior to and during its extrusion.

26. The method of forming a piston as set forth in claim 25, wherein both of the materials are aluminum alloys.

27. The method of forming a piston as set forth in claim 26, wherein the alloys of the core and the powdered material are different.

28. The method of forming a piston as set forth in claim 27, wherein one of the materials has a property having characteristics selected from the group of strength and abrasion resistance that is substantially greater than the other.

29. The method of forming a piston as set forth in claim 28, wherein the one material comprises the powdered material.

30. The method of forming a piston as set forth in claim 17, wherein the powdered material is formed by forming an ingot from the alloy of aluminum and an alloying material, melting the ingot, dispersing the resulting liquid as a spray in a chilling stream to form powdered metal particles.

31. The method of forming a piston as set forth in claim 30, wherein the compression and extrusion of the powdered material is done at a material temperature less than 700° C.

32. The method of forming a piston as set forth in claim 31, wherein the compression and extrusion is done at a material temperature in the range of 400–500° C.

* * * * *

UNITED STATES PATENT AND TRADEMARK OFFICE
CERTIFICATE OF CORRECTION

PATENT NO. : 6,363,608 B1
DATED : April 2, 2002
INVENTOR(S) : Koike et al.

It is certified that error appears in the above-identified patent and that said Letters Patent is hereby corrected as shown below:

Drawings,
Delete Figs. 1-15 and replace with the attached Figs. 1-15.

Signed and Sealed this

Twenty-ninth Day of April, 2003

JAMES E. ROGAN
*Director of the United States Patent and Trademark Office*